(12) United States Patent
Goriga et al.

(10) Patent No.: US 12,743,881 B2

(45) Date of Patent: Sep. 22, 2026

(54) METHODS AND SYSTEMS FOR USE IN IDENTIFYING FEATURES OF CROPS

(71) Applicant: MONSANTO TECHNOLOGY LLC, Saint Louis, MO (US)

(72) Inventors: Chethana Goriga, Chesterfield, MO (US); Anthony James Jones, Saint Louis, MO (US); Jeremy Joshua Pittman, Ardmore, OK (US)

(73) Assignee: MONSANTO TECHNOLOGY LLC, Saint Louis, MO (US)

( * ) Notice: Subject to any disclaimer, the term of this patent is extended or adjusted under 35 U.S.C. 154(b) by 224 days.

(21) Appl. No.: 18/784,661

(22) Filed: Jul. 25, 2024

(65) Prior Publication Data

US 2025/0037456 A1 Jan. 30, 2025

Related U.S. Application Data

(60) Provisional application No. 63/529,330, filed on Jul. 27, 2023.

(51) Int. Cl.
*G06V 20/10* (2022.01)
*G06V 10/10* (2022.01)
(Continued)

(52) U.S. Cl.
CPC ............ *G06V 20/188* (2022.01); *G06V 10/16* (2022.01); *G06V 10/20* (2022.01); *G06V 10/56* (2022.01)

(58) Field of Classification Search
CPC ...... G06V 20/188; G06V 10/16; G06V 10/20; G06V 10/56
See application file for complete search history.

(56) References Cited

U.S. PATENT DOCUMENTS

2007/0003107 A1 1/2007 Wei et al.
2018/0027725 A1 2/2018 Koutsorodi et al.
(Continued)

FOREIGN PATENT DOCUMENTS

CN 113298768 A 8/2021

OTHER PUBLICATIONS

Sun, Shangpeng ("Three-dimensional photogrammetric mapping of cotton bolls in situ based on point cloud segmentation and clustering") ISPRS Journal of Photogrammetry and Remote Sensing 160. (Year: 2020).*

*Primary Examiner* — Molly Wilburn
(74) *Attorney, Agent, or Firm* — Harness, Dickey & Pierce, P.L.C.

(57) ABSTRACT

Systems and methods for identifying features(s) of crops are provided. One example computer-implemented method includes accessing image data specific to a cotton plant. The image data includes images of the cotton plant and, for each image, depth data indicative of a range between surfaces of the cotton plant and a camera(s) that captured the image. The image data further includes tracking data for a device including the camera(s). The method also includes stitching together point clouds, which are defined by the images of the cotton plant, and identifying brighter white segments and darker white segments in the stitched point clouds. The brighter white segments and darker white segments define segment pairs. The method then also includes appending a line between the brighter white segment and the darker white segment of each of the pairs and determining a feature of the cotton plant based on the appended lines and/or pairs.

19 Claims, 8 Drawing Sheets

(51) Int. Cl.
*G06V 10/20* (2022.01)
*G06V 10/56* (2022.01)

(56) References Cited

U.S. PATENT DOCUMENTS

| | | | |
|---|---|---|---|
| 2018/0042176 | A1 | 2/2018 | Obropta et al. |
| 2018/0217072 | A1 | 8/2018 | Chaudhary et al. |

* cited by examiner

METHODS AND SYSTEMS FOR USE IN IDENTIFYING FEATURES OF CROPS

CROSS-REFERENCE TO RELATED APPLICATION

This application claims the benefit of, and priority to, U.S. Provisional Application No. 63/529,330, filed Jul. 27, 2023. The entire disclosure of the above application is incorporated herein by reference.

FIELD

The present disclosure generally relates to methods and systems for use in identifying features of crops, and in particular, for use in identifying, based on image data including the crops (e.g., including depth data and tracking data, etc.), specific features related to the crops.

BACKGROUND

This section provides background information related to the present disclosure which is not necessarily prior art.

Crops are planted, grown and harvested from various different growing spaces. In connection with breeding, or testing of certain crops, various features of the crops may be counted, tested and/or measured. For example, yield, in bushels per acre, may be determined at harvest as a performance feature of the crops. Likewise, the height of the crops, root strength, number of ears of corn, or other suitable phenotypic features, etc., may be determined, counted, or measured before, during and/or after growth of the crops in the growing spaces as a basis for determining performance of the crops. Breeding may be employed, then, based on the accumulated data, in an attempt to make decisions related to advancement of crops having desirable performance and/or phenotypic traits.

SUMMARY

This section provides a general summary of the disclosure and is not a comprehensive disclosure of its full scope or all of its features.

Example embodiments of the present disclosure generally relate to methods for identifying features(s) of crops. In one example embodiment, such a method generally includes: accessing, by a computing device, image data specific to a cotton plant, the image data including multiple images of the cotton plant and, for each image, depth data indicative of a range between surfaces of the cotton plant and one of multiple cameras, which captured the respective image, the image data further including tracking data for a surveyor computing device including the multiple cameras; stitching, by the computing device, multiple point clouds together, the multiple point clouds defined by the multiple images of the cotton plant; identifying brighter white segments and darker white segments in the stitched point clouds, the brighter white segments and darker white segments defining multiple pairs, each pair including one brighter white segment and one darker white segment; appending, by the computing device, a line between the brighter white segment and the darker white segment of each of the pairs; and determining, by the computing device, a feature of the cotton plant based on the appended lines and/or the pairs.

Example embodiments of the present disclosure also relate to non-transitory computer-readable storage media including executable instructions for identifying features(s) of crops. In one example embodiment, such a non-transitory computer-readable storage medium includes executable instructions, which when executed by at least one processor, cause the at least one processor to perform the operations described herein.

Example embodiments of the present disclosure also relate to systems for use in identifying features(s) of crops. In one example embodiment, such a system generally includes at least one surveyor computing device configured to capture image data and at least one computing device, which is configured to perform the operations described herein.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments, are not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

For particular assessments of crops, such as, for example, a number of cotton bolls on a cotton plant, the assessment is typically accomplished through manual inspection, whereby a person enters a growing space and counts the number of cotton bolls per plant and records the information to a log. In addition to counting of cotton bolls, the person may further assess, weigh or measure cotton boll density or size. Beyond the labor intensity of such inspection, and the lack of scalability of the manual processes, the precision and objectivity of the assessment may be affected (e.g., reduced, etc.) by the subjective nature of the person, or the attention of the person, performing the assessment, whereby the resulting data may be unreliable and/or erroneous, which, in turn, may negatively impact subsequent decisions, or processes, dependent on the data. Providing for precision and objectivity, while also providing for scalability as well as reduced and/or elimination of manual processing, prior to the present disclosure, has been beyond conventional technologies.

Uniquely, the systems and methods herein automatically process image data for crops, where the image data includes relative position data and tracking data, such that specific features related to the crops (e.g., counts, density, sizes, etc.) are identified.

Figure 1:
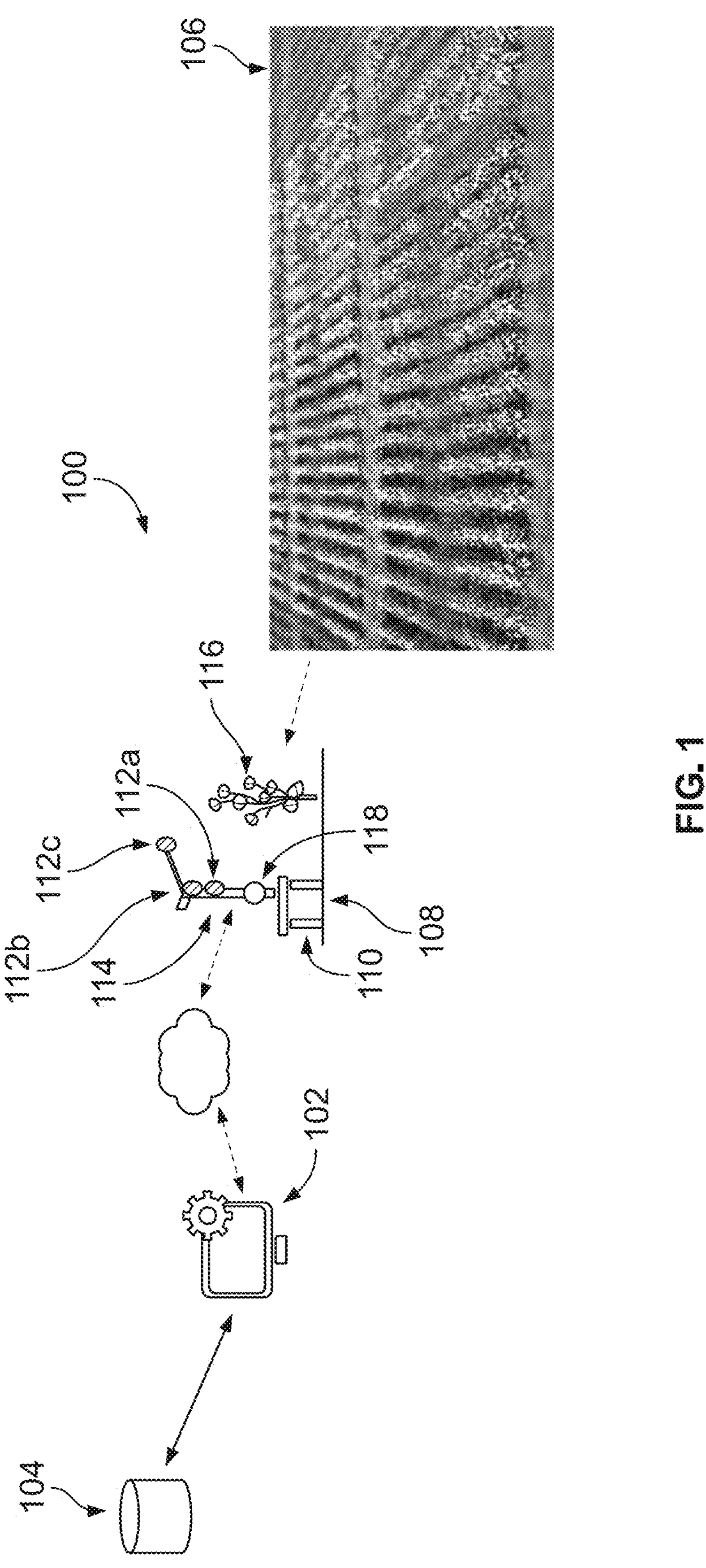
FIG. 1 illustrates an example system of the present disclosure, which includes a surveyor computing device, and where the system is configured for identifying features(s) of crops.

FIG. 1 illustrates an example system 100 in which one or more aspects of the present disclosure may be implemented. Although the system 100 is presented in one arrangement, other embodiments may include the parts of the system 100 (or additional parts) arranged otherwise depending on, for example, sources and/or types of image data, arrangements of fields, types of surveyor devices/cameras used to capture images of crops in fields, types of crops in the fields, etc.

In the example embodiment of FIG. 1, the system 100 generally includes a computing device 102 and a database 104, which is coupled to (and/or is otherwise in communication with) the computing device 102, as indicated by the arrowed line therebetween. The computing device 102 is illustrated as separate from the database 104 in FIG. 1, but it should be appreciated that the database 104 may be included, in whole or in part, in the computing device 102 in other system embodiments.

In addition, in some example embodiments, the computing device 102 may be located in a facility adjacent to or in a field, such as, for example, a field 106 of FIG. 1. Alternatively, or additionally, the computing device 102 may be located at a facility associated with the management of various fields, or performance of the crops in the various fields (e.g., a seed developer, a grower, etc.). In one embodiment, the computing device 102 and the database 104 may be included, at least in part, in a cloud computing environment and accessed by a mobile computing device (not shown) associated with one or more users (e.g., seed developers, growers, etc.). In still another example, the computing device 102 and the database 104 may be included, at least in part, in the mobile computing device associated with the one or more users.

As shown in FIG. 1, the system 100 includes the field 106, which includes various cotton plants, in this example, with one example cotton plant shown in detail and referenced 116. Despite the limited illustration in FIG. 1, the field 106 generally covers several acres (e.g., 1 acre, 10 acres, 50 acres, 100 acres, or more or less, etc.), and includes dozen(s) or hundred(s) of rows, or other organizations or arrangements, of cotton plants throughout the field 106. It should also be understood that the field 106 may be any growing space, from a small test plot to a larger commercial region covering hundreds of acres, etc. In addition, the field 106 may include an outdoor growing space or it may include a greenhouse or other indoor growing space.

In addition to the above, it should further be appreciated that, while the field 106 is described/illustrated as including cotton plants, other varieties or types of plants may be included in the field 106 and/or in other fields within the scope of the present disclosure. More broadly, the system 100 is described herein for identifying features of the cotton plants illustrated in FIG. 1, yet the system 100 may also be configured, with limited changes, to identify features of not only cotton plants, but other types of plants (e.g., counts for cars of corn, etc.).

That said, as shown in FIG. 1, the system 100 includes a surveyor computing device 108, which is configured to move within the field 106. The surveyor computing device 108 is illustrated in FIG. 1 as being separate from the computing device 102 and the database 104, in this example embodiment. That said, it should be appreciated that in one or more other embodiments, the surveyor computing device 108 may include, in whole or in part, the computing device 102 and/or the database 104 (e.g., physically present at the surveyor computing device 108, etc.).

In this example, the surveyor computing device 108 defines dimensions, and in particular, a width that is compatible with the cotton plants included in the field 106, in general or based on the specific planting patterns associated with the cotton plants. In this example embodiment, the surveyor computing device 108 includes a base 110 having a width between about ten and about thirty inches, where the base 110 includes tracks, wheels, etc., or broadly, a transport mechanism or device, to move the surveyor computing device 108 within the field 106 and/or between/along two (or more) rows of cotton plants in the field 106. The surveyor computing device 108 may also include a motor and power source (e.g., a battery power source, etc.) coupled on board the base 110, for example, configured to power the transport mechanism or device and cause movement of the surveyor computing device 108 through the field 106.

Figure 2:
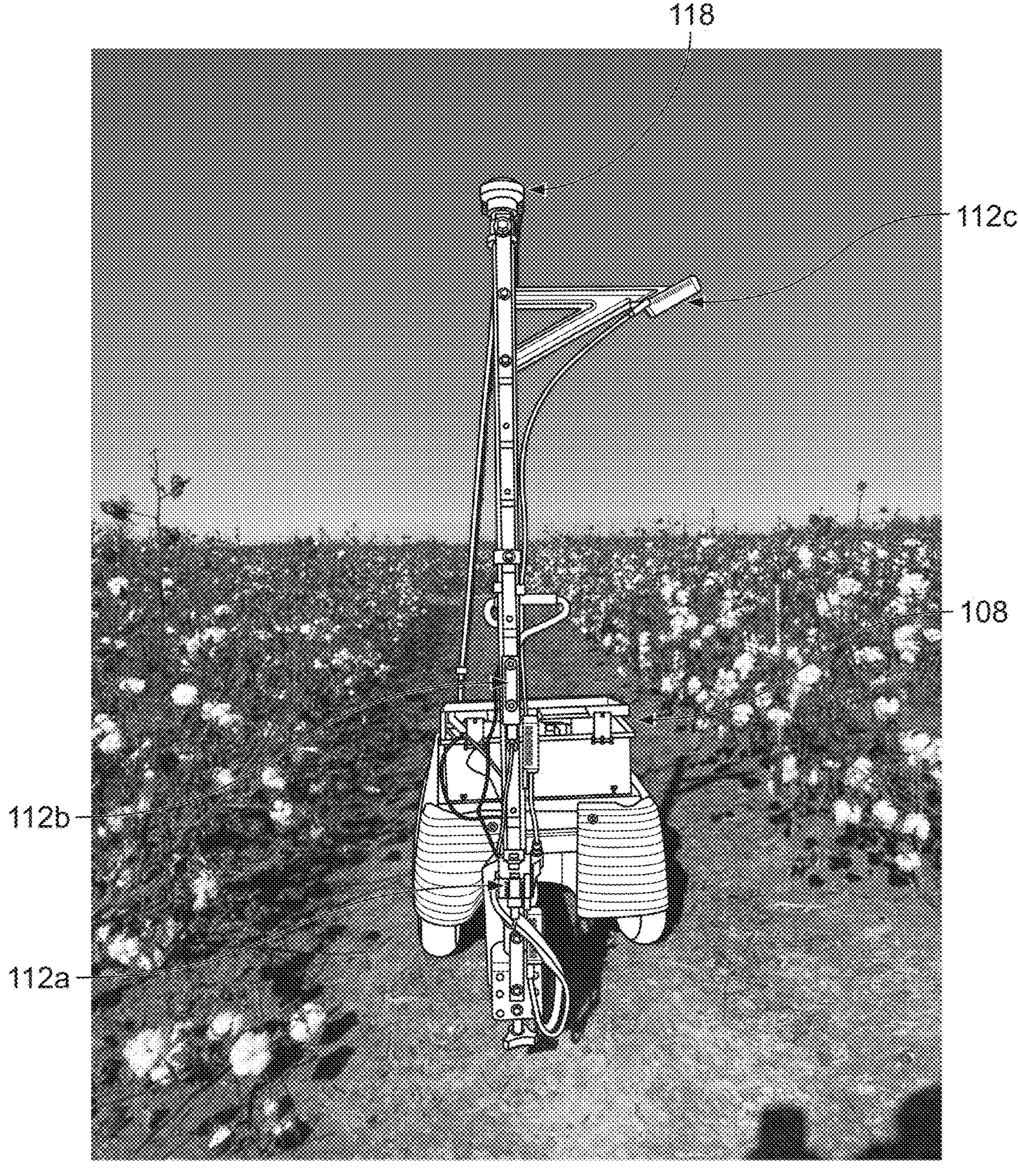
FIG. 2 is a detailed view of the example surveyor computing device included in FIG. 1.

In this example embodiment, the surveyor computing device 108 also includes three cameras 112*a-c*, which are mounted on a stand 114 that extends upwardly from the base 110 of the surveyor computing device 108. The example stand 114 defines a substantial L-shape or half-Y-shape or may define a T-shape or Y-shape, each having a boom configured to extend toward, or at least partially over, a row of cotton plants adjacent to the surveyor computing device 108 when in use. In addition, in the illustrated embodiment, two of the cameras 112*a-b* are mounted over the base 110, and the third camera 112*c* is mounted at an end of, or near the end of, the boom (as shown in FIG. 1) thereby extending the field of view of the camera 112*c* to a top of the cotton plants (e.g., over the cotton plants, etc.). As shown in more detail in FIG. 2, in this example embodiment, the three cameras 112*a-c* are each disposed at specific heights from the ground and/or the cotton plants, and at a different position relative to the ground, thereby defining different fields of view. In addition, the three cameras 112*a-c* are aligned so that a 360-degree view of the cotton plants may be captured, from the ground to the top on both sides of the cotton plants. For example, the camera 112*a* may be positioned at between about six inches and about two feed above the ground, while the camera 112*b* may be positioned at about two feet and about five feet above the ground, and as noted above, the camera 112*c* may be positioned over the cotton plant and directed essentially downward on the cotton plants in the rows in the field 106. The camera 112*c* may be position at seven, eight, nine, ten, etc., feet (or more or less) (depending on a desired field of view), in this example, given the average height of cotton plants in the field 106 being about five feet. That said, the above distances/positions of the cameras 112*a-c* are example in nature, with it to be appreciated that the cameras 112*a-c* may be located at different heights relative to the ground in other example embodiments.

Additionally, the cameras 112*a-c* are configured to capture color data and also depth data of an object, i.e., the cameras 112*a-c* are depth cameras or stereo vision cameras, etc. The surveyor computing device 108 may also include an inertial measurement unit (IMU) (as part of the cameras 112*a-c* or as a separate device) configured to measure and report raw or filtered angular rate data and/or force/acceleration data associated with the e surveyor computing device 108. In connection therewith, the captured data may be stored in desired formats, for example, in *.png format (RGB data), in *.raw format (depth data), in *.txt format (IMU data), in other formats, etc. An example depth camera that may be used herein includes a REALSENSE depth camera by INTEL CORPORATION. In example embodiments, one or more of the cameras 112*a-c* may include the following features: 2 MP RGB; depth FOV-87°×58°, RGB FOV−69°×42°; etc. In example embodiments, one or more of the cameras 112*a-c* may also include (or alternatively include) the following features: depth FOV−110° (H)×70° (V)×120° (D) max. As such, the cameras 112*a-c* are each configured to simultaneously capture Red-Green-Blue (RGB) image data in the visible light spectrum and depth data representing distance from the respective camera to a surface of the cotton plant (and other surfaces in the field of view of the camera).

In this example embodiment, as indicated above, the surveyor computing device 108 includes at least one tracking device 118, which is configured to track and/or capture the IMU data and location data, as the surveyor computing device 108 moves in the field 106. In this manner, the tracking device 118 may include an INTEL RELSENSE T265 device from INTEL CORPORATION and/or a GNSS GPS unit, model DA2, by TRIMBLE INC. Consequently, it should be appreciated that the tracking device 118 may include multiple devices but may include only one tracking device in other examples.

The captured IMU data includes an angular rate and specific force/acceleration of the cameras 112*a-c* mounted on the surveyor computing device 108, relative to a reference point, as it traverses the rows of the field 106, which, generally, is indicative of movement of the cameras 112*a-c* and the surveyor computing device 108. And, the detected location data may be expressed, for example, as specific force or acceleration, angular rate, and potentially, magnetic field surrounding the tracking device 118, each in three directions (X, Y, Z) or otherwise, etc. And, the location data is captured via GPS, WIFI signals, or other techniques, etc., as the cameras 112*a-c* and the surveyor computing device 108 moves and/or at instances in which images are captured. The detected location data may be expressed, for example, as GPS-time coordinates (e.g., [latitude, longitude, time/date], etc.) or otherwise, etc.

The surveyor computing device 108 is also configured to associate or link the IMU data and/or location data captured by the tracking device 118 to the specific capture of images captured by the cameras 112*a-c* (and other cameras) and/or the associated depth data (e.g., by time stamp, etc.), whereby movement between captured images is indicated by the IMU data and/or location data.

It should be appreciated that other cameras, sensors and/or devices may be included in the surveyor computing device 108, whereby the same may be configured to detect and/or determine aspects, features or conditions of the cotton plants in the field 106, of the field 106 itself, environment of the field 106, and/or the surveyor computing device 108, etc. Likewise, in the illustrated embodiment, while three cameras 112*a-c* are included and directed toward one side of the surveyor computing device 108, the surveyor computing device 108 in other embodiments may include a different number of cameras, including, for example, additional cameras directed in an opposite (or different) side than the cameras 112*a-c* to capture image date of a second row of cotton plants on the opposite side of the surveyor computing device 108, whereby images of two rows in the field 106 may be captured simultaneously.

In still other embodiments, a surveyor computing device may be configured to be stationary or fixed in location, or mounted to a stationary structure, whereby plants (e.g., disposed on trays, conveyors, carts, tracks, etc.) are identified by scanning a barcode, QR code, or other indicia to identify the plants (as compared to locations above), and then, the plants are moved relative to the surveyor computing device, whereby images of the plants are captured. The stationary surveyor computing device, in this example, may be more readily usable in a greenhouse, while the mobile surveyor computing device may be more readily useable in a field, etc.

That said, it should be appreciated that the description herein is generally applicable to the stationary surveyor computing device to determine specific features of the plants therein, despite the reversed of the relative movement.

With specific reference to the embodiment in FIG. 1, at one or more times or intervals, during a crop season, a grower or seed developer may require or desire specific feature data for the cotton plants in the field 106 (e.g., as part of a quality control verification of one or more models, etc.). Accordingly, the surveyor computing device 108 is positioned in the field 106, relative to a row, or multiple rows, of cotton plants. The surveyor computing device 108 then, upon command or instruction, is configured to traverse the field 106, row by row, and to capture image data and other data, via the cameras 112*a-c* and the tracking device 118, for the cotton plants. The image data includes the images, in combination with the depth data (of the cameras 112*a-c* relative to the plants 116), and the IMU data and the location data for the surveyor computing device 108. This data together is referred to herein in total as image data.

In doing so, the surveyor computing device 108 may be configured to operate off of a single reference point or may set a reference point at the beginning of each new row, or otherwise.

Further, it should be appreciated that the cotton plants in the field 106 are generally defoliated, when the images are captured, whereby leaves of the cotton plants are not present, which provides improved visual access to the cotton bolls of the cotton plants, as compared to cotton plants with leaves. Defloration of the cartoon plants may be optional in certain embodiments.

In this example embodiment, the surveyor computing device 108 is further configured to communicate the image data to the computing device 102. The image data may be communicated in real time, as it is captured by the surveyor computing device 108, or at one or more regular or irregular intervals, such as, for example, at the end of each row, at the end of the field 106, etc. As such, the surveyor computing device 108 is coupled in communication, via one or more networks, etc., (as indicated by the dotted lines), with the computing device 102. The one or more networks may include, without limitation, a local area network (LAN), a wide area network (WAN) (e.g., the Internet, etc.), a mobile network, a virtual network, and/or another suitable public and/or private network capable of supporting communication between the surveyor computing device 108 and the computing device 102, or a combination thereof.

In turn, the computing device 102 is configured to store the image data in the database 104, per field, per row, per surveyor computing device, etc.

In addition to the image data, it should be appreciated that the database 104 may also include data related to the field 106, and in particular, the cotton plants 116 in the field 106. The data may include specific plant types, varieties, genetic profiles (e.g., trait stacks, etc.), management practices (e.g., treatments (e.g., fertilizers, fungicides, etc.), irrigation, tillage, etc.), identifiers unique to each of the plants/rows, and also location data for the particular plants, etc.

In this example embodiment, the computing device 102 is configured to then access the image data in the database 104 and to identify features of the cotton plants 116, such as, for example, counts of cotton bolls, densities of the cotton bolls, sizes of cotton bolls, etc., for the cotton plants 166 in the field 106.

Initially, in particular, the computing device 102 is configured to generate three-dimension images of the cotton plants 116 (e.g., per row, etc.), by stitching point cloud data together (where the point cloud data is defined by the images of the cotton plants 116). In connection therewith, the computing device 102 is configured to access the image data captured by the surveyor computing device 108 in the field 106 and to align the RGB data and the depth data from the cameras 112*a*-*c*, based on the time stamp of the data. The output of the alignment includes a file, which includes XYZ-RGB data for each image, per pixel, with XYZ being the relative position data (to a reference point) and RGB being the color band data. The computing device 102 is configured to then further process the aligned data by converting the binary file of the XYZ-RGB data to an ASCII cloud file, or point cloud data, and by impose boundaries on the images. Specifically, for example, when the surveyor computing device 108 is disposed in the field 106 to captured images, the surveyor computing device 108 is within about five, about ten, about fifteen or about twenty-four (or more or less), inches from the cotton plants 116, which have a width of a few feet. In one example, the plants in the field 106 may be planted with a thirty inch row separation. In this example, when the surveyor computing device 108 is disposed in the field 106, the device 108 may be about fifteen inches away from the plants in the rows. The target plants for image capture, then, may be located between about fifteen inches and about forty-five inches from the surveyor computing device 108. As such, the computing device 102 may be configured to filter out XYZ-RGB data, which is outside the boundary of more than, for example, about forty-five inches from the surveyor computing device 108 (e.g., and camera 112*a*, etc.). In this way, the images captured by the surveyor computing device 108 include the plants in the immediate row and null out plants in adjacent rows (e.g., rows beyond the immediate row, etc.).

Figure 3:
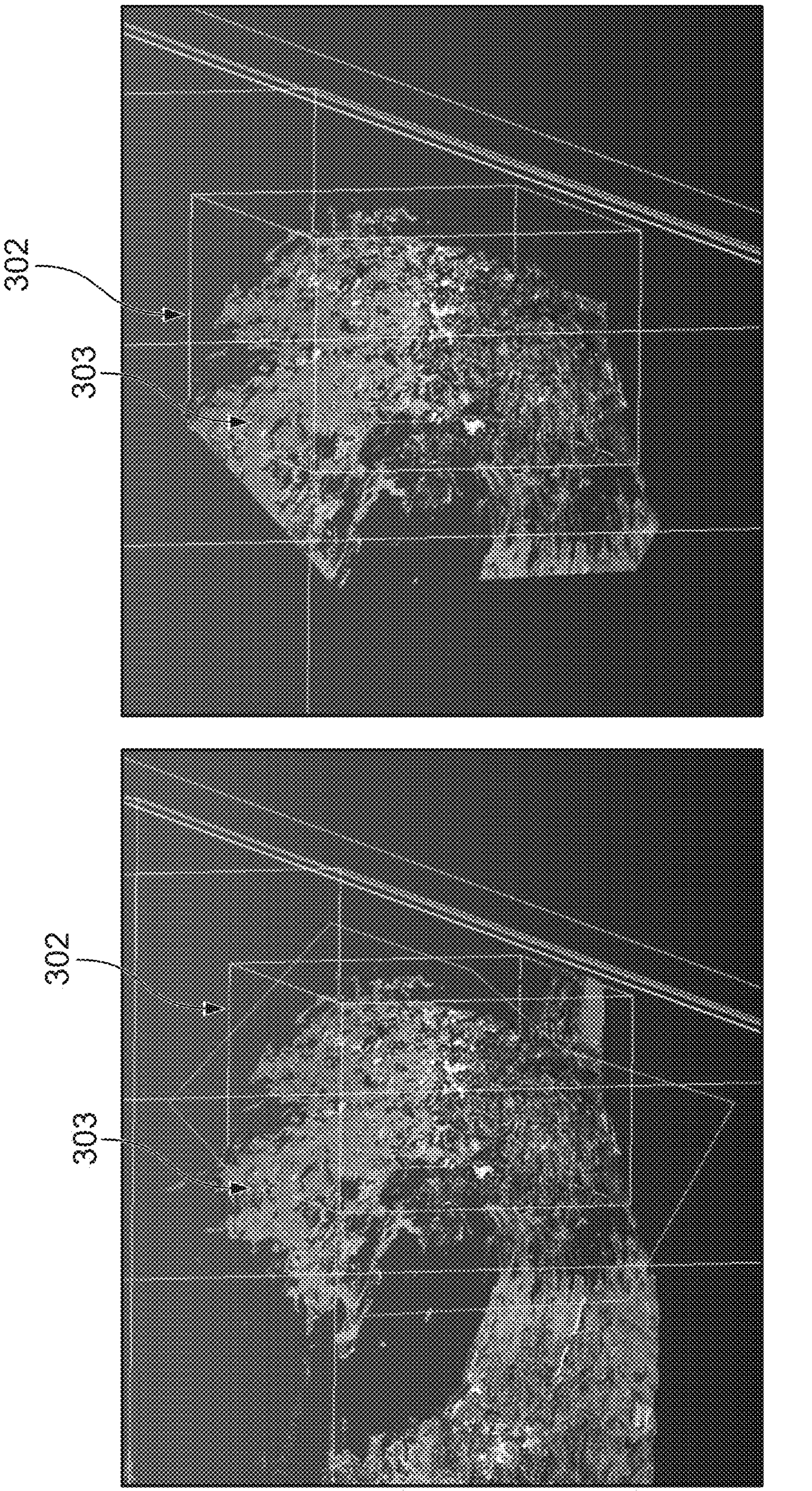
FIG. 3 is an example image of point cloud data, in which a boundary is applied to filter data included in the point cloud data.

FIG. 3 illustrates an example boundary applied to the point cloud data, which is associated with the surveyor computing device 108, whereby point cloud data outside the boundary 302 is removed or filtered out, by the computing device 102, i.e., from the left image in FIG. 3 (start data) to the right image in FIG. 3 (filtered data). As shown, the boundary includes only two planes (i.e., incomplete cube/box) to filter out data too close and too far from the surveyor computing device 108 (based on a distance threshold). In addition, although not shown in FIG. 3, blue color (or other color) associated with or indicative of the sky (e.g., included as the upper shaded portion 303 near the bounding box in the images in FIG. 3) may also be also filtered (or segmented) out from the images.

The computing device 102 is configured to then store the resulting point clouds in memory, where the point clouds are specific to the row of cotton plants.

Next, the computing device 102 is configured to stitch the point clouds together into a three-dimensional image of the cotton plants in the field 106, or more specifically, the row of the field 106. In particular, the computing device 102 is configured to correlate the points of the different point clouds, based on the IMU data and/or location data from the tracking device 118, and specifically, the IMU data and/or location data having the closest time stamp(s) to the point cloud data (i.e., from the image/depth data). The computing device 102 is configured to rotate and/or move the different point clouds into alignment in the three-dimensional image based on the correlation.

It should be appreciated that one or more three-dimensional point clouds may be compiled for the cotton plants in the field 106. For example, one three-dimensional point cloud may be compiled per row in the field 106, and identified by a unique identifier (e.g., a row identifier (ID) and field ID, etc.) and/or to a specific location of the row (e.g., by latitude and longitude, etc.).

Figure 4A:
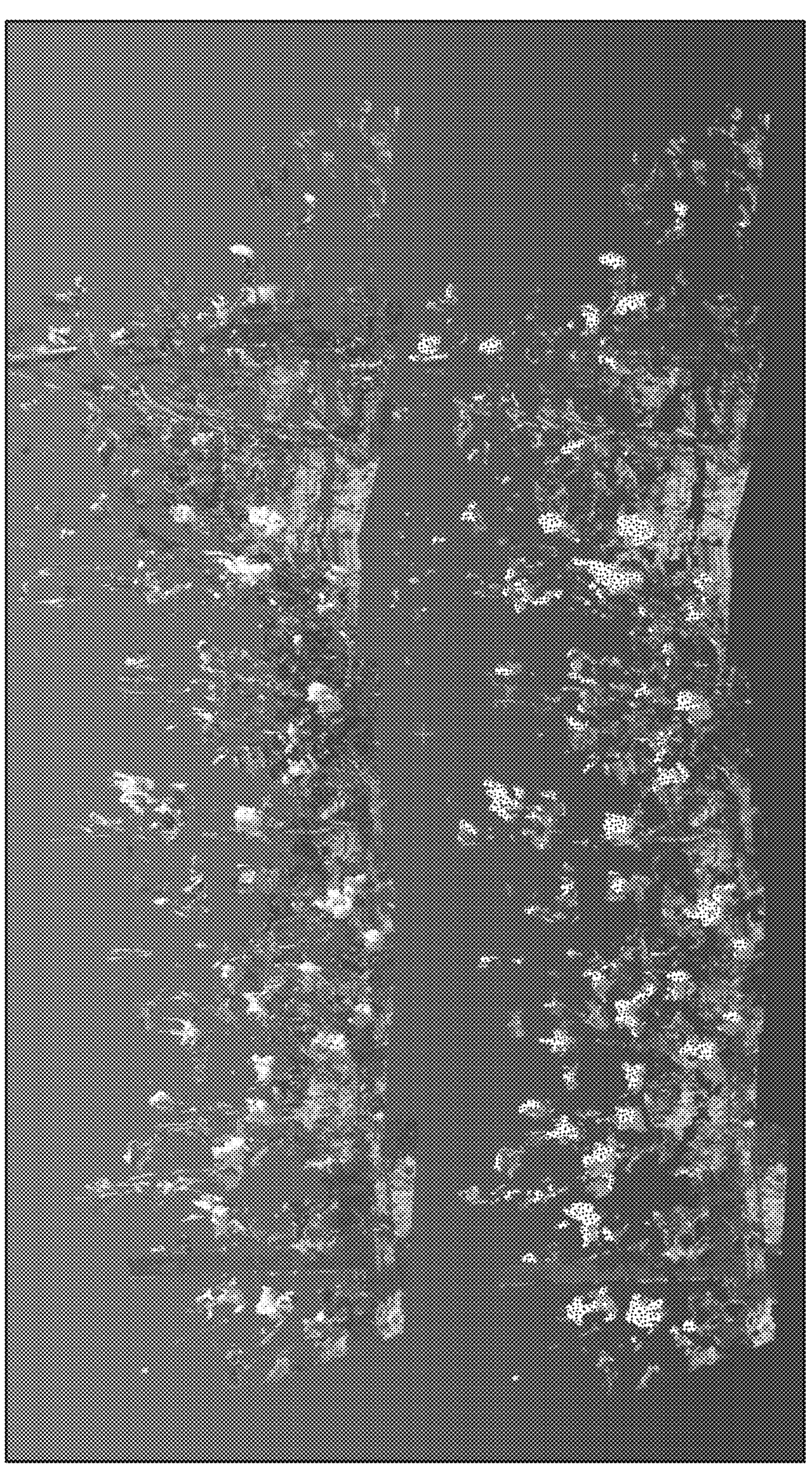
FIGS. 4A-4B are example images of point cloud data, in which segments of crops are designated, based on color, through use of the system of FIG. 1.

Next, in this example embodiment, the computing device 102 is configured to identify a color in the image consistent with the specific feature, which is the cotton bolls in this example, and therefore, the color is white. For example, the RGB data for pure white is (255, 255, 255) in decimal or FFFFFF in hexadecimal. Given a suitable threshold, the computing device 102 is configured to identify cotton bolls, and further to identify two segments of white, with one of the white segments being darker than the other of the white segments. A top image of FIG. 4A, for example, illustrates the point cloud, which includes numerous white segments. The bottom image in FIG. 4A includes the same point cloud with the white segments hatched or colored (or filled in (e.g., in dotted hatching in the illustrated embodiment, in another color (e.g., red, etc.) in other embodiments, etc.)) to further visually distinguish the white segments (or cotton bolls). Furthermore, it should be appreciated that a cotton boll exposed to sunlight from above will include a brighter white top in the sunlight and a darker white bottom in the shade. By white color detections, the computing device 102 is configured to, by a trained model, identify the different segments of white in the point cloud. That is, the computing device 102 is configured to train and use a model classifier of the different color segments to thereby identify the cotton bolls. In connection with the above, for example, the computing device 102 is configured to filter the point clouds for noise and align the filtered point clouds based off of the IMU information collected. The portion of the visible sky on the point cloud is then mapped out and deleted from the working point clouds. The point cloud at this point is enhanced to improve the quality of white and then a white segmentation filter is applied to detect both the gradients of white, and a line is drawn between both the detections. An example model classifier may include, for example, the CANUPO feature in CloudCompare processing software, etc.

Figure 4B:
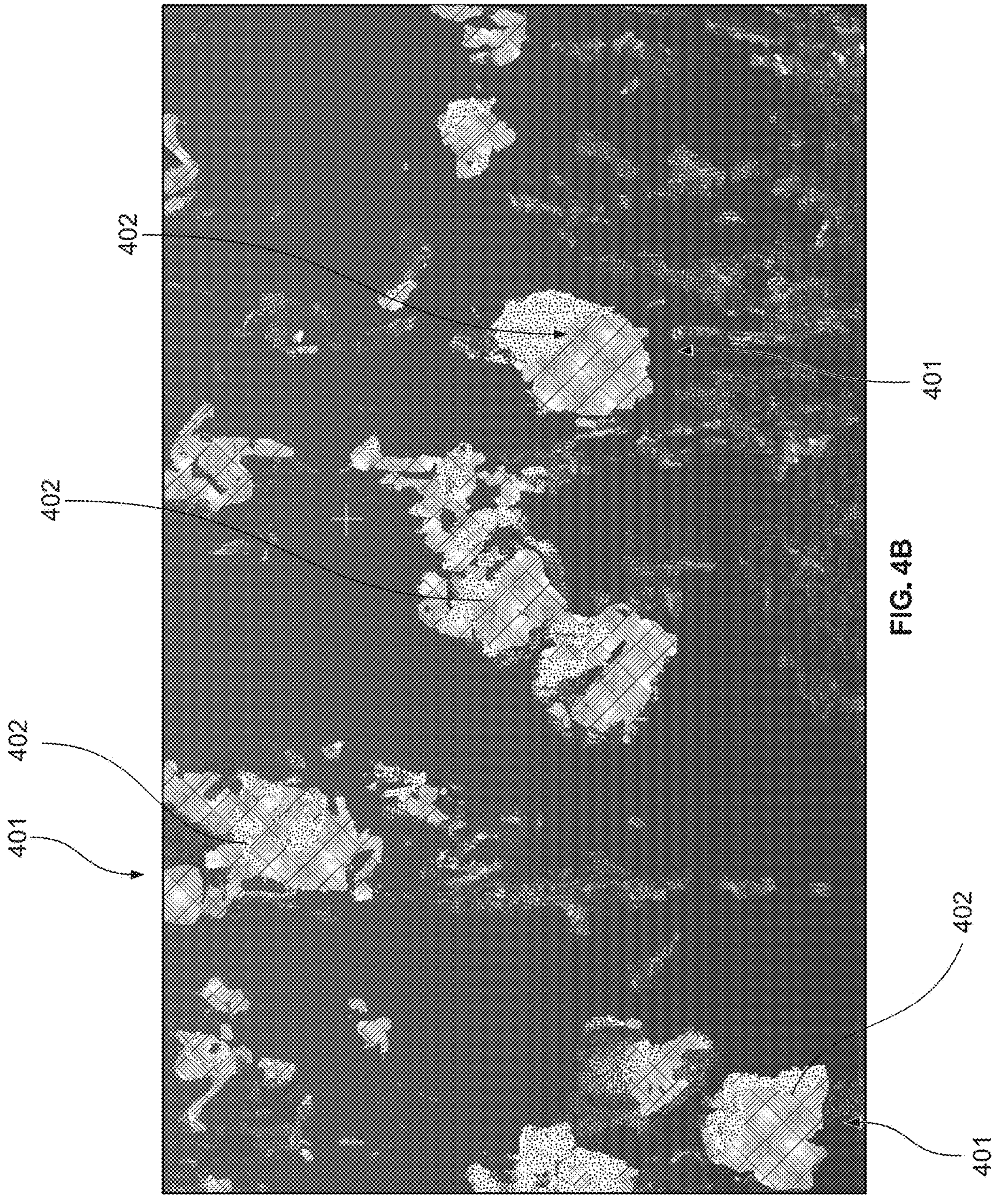

The computing device 102 is configured, by the trained model classifier, to also combine ones of the lighter segments with adjacent ones of the darker segments to define cotton bolls, into pairs (each including one brighter white segment and one darker white segment). In general, the model classifier is trained based on manually identified cotton bolls and relies on adjacency of the brighter white and darker white segments. Once combined, the computing device 102 may be configured to append a line mark to the intersection of the brighter white segments and the darker white segments, per cotton boll (or pair). The computing device 102 is configured to count the line marks, which is a count of the number of cotton bolls on the cotton plants in the row. FIG. 4B illustrates a partial view of the image from FIG. 4A, including multiple cotton bolls 401. In FIG. 4B (in this embodiment), the brighter white segments are colored or filled with a dotted hatching (or other color/fill in other embodiments, for example, a yellow color/fill or other shade, etc.), for example, and the darker white segments are colored or filled with a lined cross hatching (or other color/fill in other embodiments, for example, green or other shade, etc.), for example, for visual distinction. The line/boundary marks 402 are included for several of the cotton bolls 401, which, as shown, dissect the cotton bolls 401 into the two segments.

In addition, the computing device 102 is configured to determine a length of the line/boundary marks 402 between the brighter and darker segments, per cotton boll 401, which may be correlated then to a size and/or a density of the cotton bolls 401, as the length of the line/boundary 402 is approximate to the perimeter of the cotton boll 401. The density determination may be based on a conversion factor between a line length and density, as compiled through empirical, manual review of cotton bolls and line length.

It should be appreciated that the computing device 102 is configured to proceed as described above for each of the point clouds for the different rows of the field 106 and to determine a count and/or density of the cotton bolls in the field 106. The computing device 102 is further configured to estimate a cotton yield for the field 106, or individual rows or plants, based on the counts and/or densities of the cotton bolls.

Additionally, or alternatively, the computing device 102 may be configured to identify the cotton bolls from the RGB image data from the surveyor computing device 108. In particular, a series of RGB images from one or more fields may be captured and manually labeled to define a training set of dozens, hundreds or thousands of images, which includes a designation of cotton bolls in the images. The computing device 102 may then be configured to train a classifier model, such as, for example, a region-based convolutional neural network (e.g., Mask R-CNN, etc.) another detection algorithm (e.g., you only look once (e.g., YOLOv5, etc.), etc.), etc. Once trained, the computing device 102 may be configured to validate the trained model on a reserved portion of the training set (i.e., not used in training).

Figure 5:
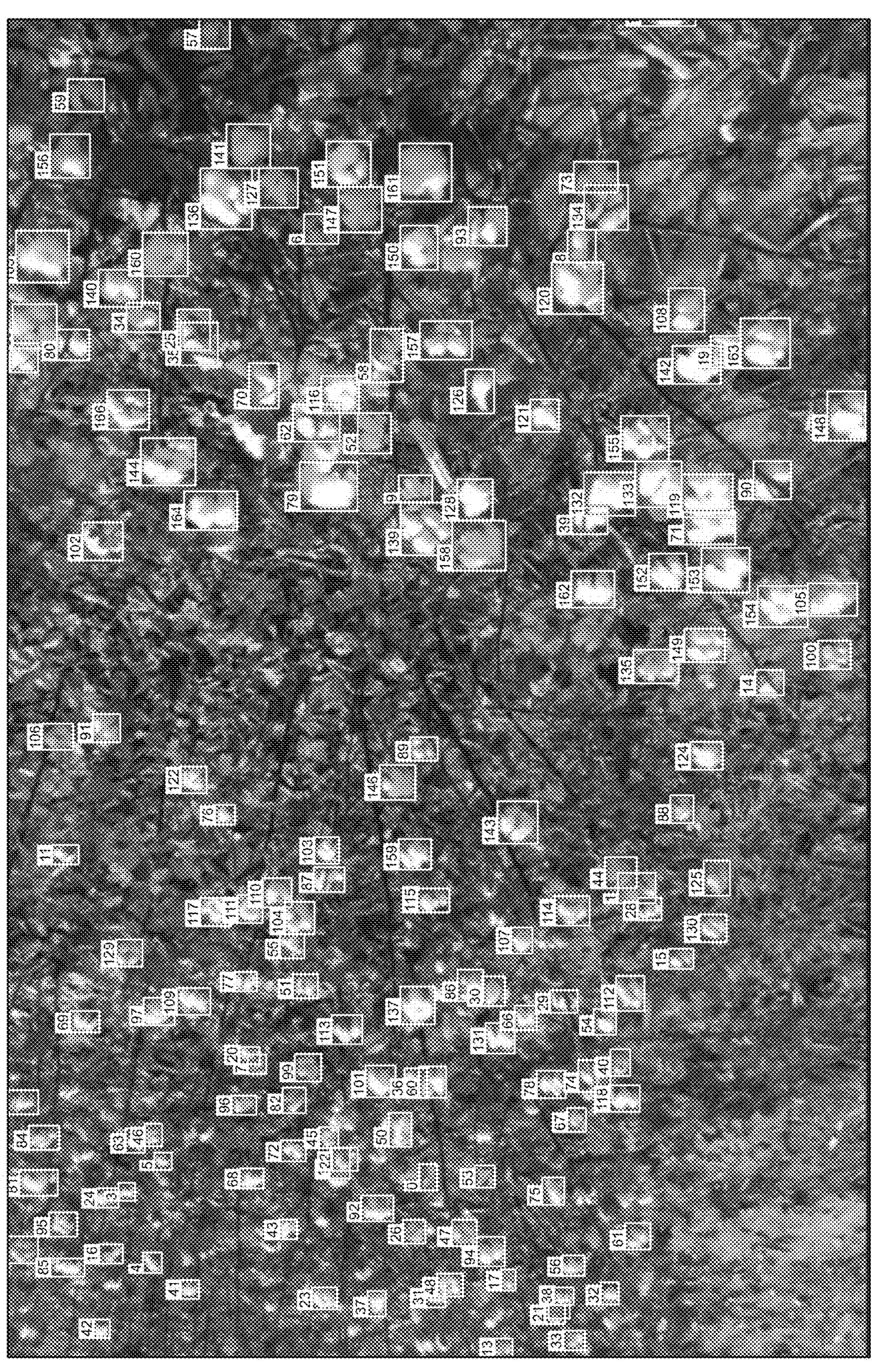
FIG. 5 is an example image of cotton plants, in which cotton bolls are identified and designated through use of the system of FIG. 1.

Once validated, the computing device 102 may be configured, by the trained model, to identify cotton bolls in the RGB images from the field 106. FIG. 5 illustrates an RGB image of multiple cotton plants with various cotton bolls identified (e.g., within the illustrated boxes, etc.) and designated with a unique identifier. As shown, each cotton boll is designated by a box, with each including a number designation (e.g., 1, 2 . . . , 163, etc.) whereby the designation provides a count and unique ID for the cotton bolls, etc.

Notwithstanding the above, in one or more embodiments, the surveyor computing device 108 is further configured to compile the image data from the cameras 112 and the different sensors and to store the compiled images therein. In such embodiments, the images remain, at least initially, in the surveyor computing device 108, wherein the computing device 102 (and the database 104) as described above is (are) included in, at least in part, the surveyor computing device 108, whereby the configuration of the computing device 102 is applicable to the surveyor computing device 108. What's more, in this example embodiment (in which the computing device 102 (and the database 104) is (are) included in, at least in part, the surveyor computing device 108), download and upload times associated with transferring the images is avoided, or at least deferred, to accelerate proceeding with the processing described herein (e.g., to real time or near real time processing, etc.).

Figure 6:
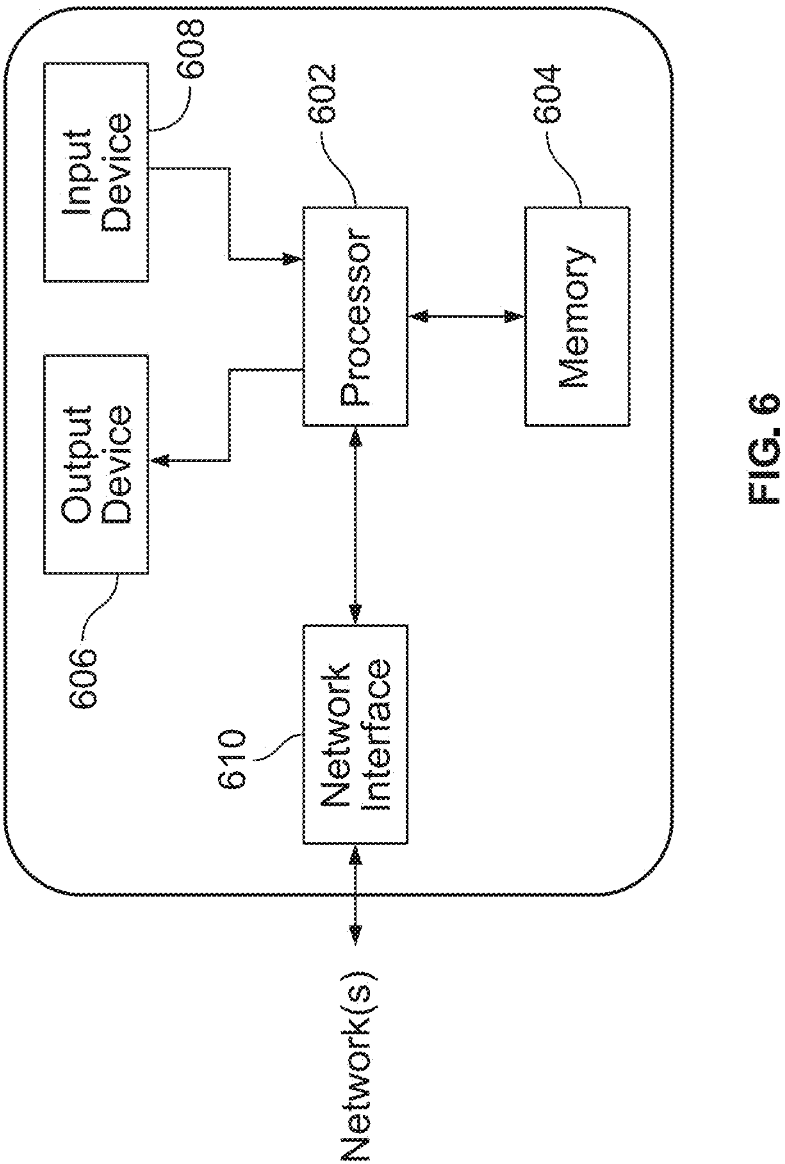
FIG. 6 is a block diagram of an example computing device that may be used in the system of FIG. 1.

FIG. 6 illustrates an example computing device 600 that may be used in the system 100 of FIG. 1. The computing device 600 may include, for example, one or more servers, workstations, personal computers, laptops, tablets, smartphones, virtual devices, etc. In addition, the computing device 600 may include a single computing device, or it may include multiple computing devices located in close proximity or distributed over a geographic region, so long as the computing devices are specifically configured to operate as described herein. In the example embodiment of FIG. 1, the computing device 102 and the surveyor computing device 108 (e.g., including the cameras 112*a-c*, tracking device 118, sensors, etc.) include and/or are implemented in one or more computing devices consistent with computing device 600. The database 104 may also be understood to include and/or be implemented in one or more computing devices, at least partially consistent with the computing device 600. However, the system 100 should not be considered to be limited to the computing device 600, as described below, as different computing devices and/or arrangements of computing devices may be used. In addition, different components and/or arrangements of components may be used in other computing devices.

As shown in FIG. 6, the example computing device 600 includes a processor 602 and a memory 604 coupled to (and in communication with) the processor 602. The processor 602 may include one or more processing units (e.g., in a multi-core configuration, etc.). For example, the processor 602 may include, without limitation, a central processing unit (CPU), a microcontroller, a reduced instruction set computer (RISC) processor, a graphics processing unit (GPU), an application specific integrated circuit (ASIC), a programmable logic device (PLD), a gate array, and/or any other circuit or processor capable of the functions described herein.

The memory 604, as described herein, is one or more devices that permit data, instructions, etc., to be stored therein and retrieved therefrom. In connection therewith, the memory 604 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media for storing such data, instructions, etc. In particular herein, the memory 604 is configured to store data including, without limitation, image data (e.g., images, depth data, etc.), models, parameters, phenotypic data, and/or other types of data (and/or data structures) suitable for use as described herein.

Furthermore, in various embodiments, computer-executable instructions may be stored in the memory 604 for execution by the processor 602 to cause the processor 602 to perform one or more of the operations described herein (e.g., one or more of the operations of method 700, etc.) in connection with the various different parts of the system 100, such that the memory 604 is a physical, tangible, and non-transitory computer readable storage media. Such instructions often improve the efficiencies and/or performance of the processor 602 that is performing one or more of the various operations herein, whereby such performance may transform the computing device 600 into a special-purpose computing device. It should be appreciated that the memory 604 may include a variety of different memories, each implemented in connection with one or more of the functions or processes described herein.

In the example embodiment, the computing device 600 also includes an output device 606 that is coupled to (and is in communication with) the processor 602 (e.g., a presentation unit, etc.). The output device 606 may output information (e.g., point cloud data, cotton boll data, etc.), visually or otherwise, to a user of the computing device 600, such as a researcher, grower, etc. It should be further appreciated that various interfaces (e.g., as defined by network-based applications, websites, etc.) may be displayed or otherwise output at computing device 600, and in particular at output device 606, to display, present, etc. certain information to the user. The output device 606 may include, without limitation, a liquid crystal display (LCD), a light-emitting diode (LED) display, an organic LED (OLED) display, an "electronic ink" display, speakers, a printer, etc. In some embodiments, the output device 606 may include multiple devices. Additionally, or alternatively, the output device 606 may include printing capability, enabling the computing device 600 to print text, images, and the like, on paper and/or other similar media.

In addition, the computing device 600 includes an input device 608 that receives inputs from the user (i.e., user inputs) such as, for example, selections of crops, images, etc. The input device 608 may include a single input device or multiple input devices. The input device 608 is coupled to (and is in communication with) the processor 602 and may include, for example, one or more of a keyboard, a pointing device, a touch sensitive panel, or other suitable user input devices. It should be appreciated that in at least one embodiment the input device 608 may be integrated and/or included with the output device 606 (e.g., a touchscreen display, etc.).

Further, the illustrated computing device 600 also includes a network interface 610 coupled to (and in communication with) the processor 602 and the memory 604. The network interface 610 may include, without limitation, a wired network adapter, a wireless network adapter, a mobile network adapter, or other device capable of communicating to one or more different networks (e.g., one or more of a local area network (LAN), a wide area network (WAN) (e.g., the Internet, etc.), a mobile network, a virtual network, and/or another suitable public and/or private network, etc.), including one or more network or other suitable network capable of supporting wired and/or wireless communication between the computing device 600 and other computing devices, including with other computing devices used as described herein (e.g., between the computing device 102, the database 104, etc.).

Figure 7:
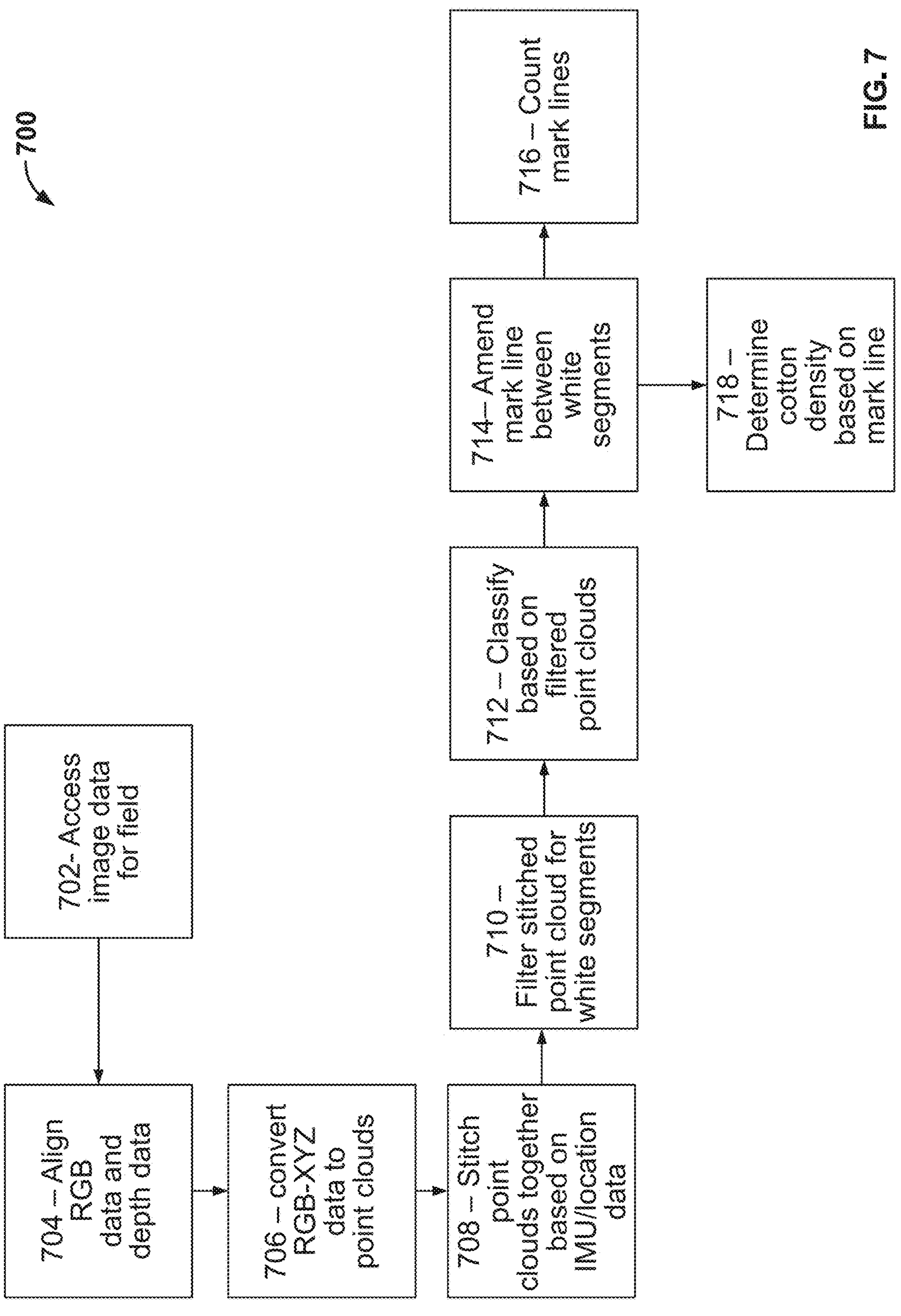
FIG. 7 illustrates a flow diagram of an example method, which may be used in (or implemented in) the system of FIG. 1, for use in identifying specific features related to cotton plants in fields.

FIG. 7 illustrates an example method 700 for identifying features(s) of cotton plants in fields. The example method 700 is described herein in connection with the system 100, and may be implemented, in whole or in part, in the computing device 102 of the system 100. Further, for purposes of illustration, the example method 700 is also described with reference to the computing device 600 of FIG. 6. However, it should be appreciated that the method 700, or other methods described herein, are not limited to the system 100 or the computing device 600. And, conversely, the systems, data structures, and the computing devices described herein are not limited to the example method 700.

At 702, the surveyor computing device 108 captures image data associated with the plant 116 in the field 106 (as shown in FIG. 1). The image data includes one or more images of the cotton plant 116 (which includes RGB data and depth data for the plants), IMU data, and location data for the surveyor computing device 108 as the images were captured thereby. It should be appreciated that other data may be included in the image data, such as, for example, sensor data, environmental data, etc.

In connection therewith, the image data is communicated from the surveyor computing device 108 to the computing device 102 (and/or the database 104).

Next, the image data is pre-processed. In this example, the pre-processing of the image data includes aligning, by the computing device 102, at 704, the color data, i.e., the RGB data from the image data, with the depth data, i.e., the XYZ coordinate data from the image data. The alignment is based on respective time stamps from the data. For example, the cameras 112*a-c* capture RGB data and depth data simultaneously, frame by frame. Metadata associated with the captured data, having the same timestamp or closest to millisecond accuracy, is then used to correspond/align the data. As aligned, the data includes RGB-XYZ data per pixel in the data file, per image, for the images captured by the surveyor computing device 108.

At 706, the computing device 102 converts the RGB-XYZ data to point clouds. The point clouds are included in .ply files, for example, which are a type of polygon file format.

At 708, the computing device 102 stitches the point clouds for the cotton plant 116 and other cotton plants in the row, for example, together based on the IMU data and/or location data associated with the point clouds. In particular, the computing device 102 segments the point clouds, wherein the point clouds are associated with a sematic label which, in this example, is a cotton boll. The computing device 102 then filters the point clouds based on color. For example, depending on the particular angle of the camera 112*a*, the sky may be part of the image, which includes a color distinct from the cotton plant 116 and its surroundings. The computing device 102 may therefore filter out colors inclusive of and similar to sky-blue.

Next, as part of step 708, the computing device 102 moves the point clouds into a specific position and pose, based on matching the time stamp of the point cloud (at capture) with a time stamp for the IMU data and/or location data (at capture), which is indicative of the movement of the surveyor computing device 108 and therefore the relative position/pose. The movements, and also rotation, of the point clouds, using the IMU data and/or location data, is based on an origin or reference point.

It should be appreciated that after the stitching in step 708, one or more manual reviews of the stitched point cloud, for example, for a row in the field 106 may be performed, whereby one or more edits and/or corrections may be imposed.

The stitched point clouds are then stored in memory (e.g., the database 104, etc.).

At 710, the computing device 102 filters the stitched point cloud for white color, and in particular, brighter white color and darker white color. In particular, the computing device 102 uses a color filter to identify the different white segments in the stitched point cloud, whereby all other data may be discarded. The white segments are then classified into brighter white segments and darker white segments, by one or more trained models. Additionally, or alternatively, the white segments may be identified by the color filter and one or more rules associated with a size of the segments, a color of the segments, or homogenous metric, etc., whereby the white segments are identified. The white segments may then be separated into brighter and darker white segments based on an average or other aggregate white color values for the segments.

Once the brighter and darker white segments are identified, the computing device 102 classifies, at 712, the segments, in brighter-darker pairs, as cotton bolls.

At 714, the computing device 102 appends mark lines to the identified cotton bolls, between the brighter white segments and the darker white segments. The computing device 102 then counts the number of cotton bolls on the cotton plant, or row of cotton plants, at 716, by counting the marked lines appended to the point cloud. Additionally, or alternatively, the computing device 102 then determines, at 718, the cotton density, per cotton boll (and then, potentially, in aggregate for the point cloud) based on the length of the appended line in the point cloud. It should be appreciated that the density may further be based on a manual survey of density of various ones of the cotton bolls identified in the point cloud, whereby a conversion factor between the mark line length and density may be defined. The computing device 102 may further convert the cotton density to a yield for the row of cotton plants, or field 106 (e.g., where the yield may be a product of the number of bolls and the density of the bolls, etc.).

In view of the above, the systems and methods herein may provide an objective, efficient manner of determining specific features of crops in fields, and in particular, in this example, counts and/or densities of cotton bolls in rows of cotton plants.

With that said, it should be appreciated that the functions described herein, in some embodiments, may be described in computer executable instructions stored on a computer readable media, and executable by one or more processors. The computer readable media is a non-transitory computer readable media. By way of example, and not limitation, such computer readable media can include RAM, ROM, EEPROM, CD-ROM or other optical disk storage, magnetic disk storage or other magnetic storage device, or any other medium that can be used to carry or store desired program code in the form of instructions or data structures and that can be accessed by a computer. Combinations of the above should also be included within the scope of computer-readable media.

It should also be appreciated that one or more aspects of the present disclosure may transform a general-purpose computing device into a special-purpose computing device when configured to perform one or more of the functions, methods, and/or processes described herein.

As will be appreciated based on the foregoing specification, the above-described embodiments of the disclosure may be implemented using computer programming or engineering techniques, including computer software, firmware, hardware or any combination or subset thereof, wherein the technical effect may be achieved by performing at least one of the following operations: (a) accessing image data specific to a cotton plant, the image data including multiple images of the cotton plant and, for each image, depth data indicative of a range between surfaces of the cotton plant and one of multiple cameras, which captured the respective image, the image data further including tracking data for a surveyor computing device including the multiple cameras; (b) stitching multiple point clouds together, the multiple point clouds defined by the multiple images of the cotton plant; (c) identifying brighter white segments and darker white segments in the stitched point clouds, the brighter white segments and darker white segments defining multiple pairs, each pair including one brighter white segment and one darker white segment; (d) appending a line between the brighter white segment and the darker white segment of each of the pairs; (e) determining a feature of the cotton plant based on the appended lines and/or the pairs; and/or (f) filtering one or more aspects of the point clouds, based on at least one color, prior to stitching the point clouds together.

Examples and embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more example embodiments disclosed herein may provide all or none of the above mentioned advantages and improvements and still fall within the scope of the present disclosure.

Specific values disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may also be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "in communication with," or "included with" another element or layer, it may be directly on, engaged, connected or coupled to, or associated or in communication or included with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in identifying features(s) of cotton crops, the method comprising:

accessing, by a computing device, image data specific to a cotton plant, the image data including multiple images of the cotton plant and, for each image, depth data indicative of a range between surfaces of the cotton plant and one of multiple cameras, which captured the respective image, the image data further including tracking data for a surveyor computing device including the multiple cameras;

stitching, by the computing device, multiple point clouds together, the multiple point clouds defined by the multiple images of the cotton plant;

identifying brighter segments and darker segments in the stitched point clouds, the brighter segments and darker segments defining multiple pairs, each pair including one brighter segment and one darker segment;

appending, by the computing device, a line between the brighter segment and the darker segment of each of the pairs; and determining, by the computing device, a feature of the cotton plant based on the appended lines and/or the pairs.

2. The computer-implemented method of claim 1, wherein the cotton plant includes multiple cotton plants in a row in a field.

3. The computer-implemented method of claim 1, further comprising filtering one or more aspects of the point clouds, based on at least one color, prior to stitching the point clouds together; and wherein the at least one color is a shade of blue and the one or more aspects include a sky.

4. The computer-implemented method of claim 3, wherein stitching the multiple point clouds together includes:

positioning the point clouds relative to one another based on the tracking data.

5. The computer-implemented method of claim 1, wherein identifying the brighter segments and the darker segments includes identifying brighter white segments and darker white segments in the stitched point clouds based on a trained classifier.

6. The computer-implemented method of claim 1, wherein the feature of the cotton plant includes a number of cotton bolls on the cotton plant.

7. The computer-implemented method of claim 1, wherein the feature of the cotton plant include a density of cotton bolls of the cotton plant; and wherein determining the density of the cotton bolls is based on the appended line for each pair of brighter segment and darker segment and a conversion factor based on inspection of multiple cotton bolls.

8. The computer-implemented method of claim 1, wherein the image data includes inertial measurement unit (IMU) data specific to the multiple images; and wherein stitching the multiple point clouds together is further based on the IMU data.

9. A system for use in identifying features(s) of cotton crops, the system comprising:

a memory; and a computing device coupled to communication with the memory, the computing device configured to:

access, from the memory, image data specific to a cotton plant, the image data including multiple images of the cotton plant and, for each image, depth data indicative of a range between surfaces of the cotton plant and one of multiple cameras, which captured the respective image, the image data further including tracking data for a surveyor computing device including the multiple cameras;

stitch together multiple point clouds, the multiple point clouds defined by the multiple images of the cotton plant;

identify brighter white segments and darker white segments in the stitched point clouds, the brighter white segments and darker white segments defining multiple pairs, each pair including one brighter white segment and one darker white segment;

append a line between the brighter white segment and the darker white segment of each of the pairs; and determine a feature of the cotton plant based on the appended lines and/or the pairs.

10. The system of claim 9, further comprising the surveyor computing device, which includes the multiple cameras; and wherein the surveyor computing device is configured to capture the image data specific to the cotton plant, via the multiple cameras.

11. The system of claim 10, wherein the multiple cameras include multiple depth cameras, which are configured to generate the depth data indicative of the range between the surfaces of the cotton plant and said one of the multiple cameras.

12. The system of claim 10, wherein the surveyor computing device includes a tracking device, which is configured to capture inertial measurement unit (IMU) data when the image data is captured; and wherein the computing device is configured to stitch together the point clouds based at least in part on the IMU data.

13. The system of claim 9, wherein the computing device is configured to further filter one or more aspects of the multiple point clouds, based on at least one color, prior to stitching the multiple point clouds together; and wherein the at least one color is a shade of blue and the one or more aspects include sky.

14. The system of claim 13, wherein the computing device is configured, in stitching the multiple point clouds together, to position the point clouds relative to one another based on the tracking data.

15. The system of claim 9, wherein the computing device is configured to identify the brighter white segments and the darker white segments in the stitched point clouds based on a trained classifier.

16. The system of claim 15, wherein the feature of the cotton plant includes a number of cotton bolls on the cotton plant.

17. The system of claim 15, wherein the feature of the cotton plant include a density of cotton bolls of the cotton plant; and wherein the computing device is configured to determine the density of the cotton bolls based on the appended line for each pair of brighter segment and darker segment and a conversion factor based on inspection of multiple cotton bolls.

18. The system of claim 9, wherein the cotton plant includes multiple cotton plants in a row in a field.

19. A non-transitory computer-readable storage medium including executable instructions for processing image data, which when executed by at least one processor, cause the at least one processor to:

access image data specific to a cotton plant, the image data including multiple images of the cotton plant and, for each image, depth data indicative of a range between surfaces of the cotton plant and one of multiple cameras, which captured the respective image, the image data further including tracking data for a surveyor computing device including the multiple cameras;

stitch together multiple point clouds, the multiple point clouds defined by the multiple images of the cotton plant;

identify brighter segments and darker segments in the stitched point clouds, the brighter segments and darker segments defining multiple pairs, each pair including one brighter segment and one darker segment;

append a line between the brighter segment and the darker segment of each of the pairs; and determine a feature of the cotton plant based on the appended lines and/or the pairs.

* * * * *